United States Patent
Qin et al.

(10) Patent No.: US 9,056,928 B2
(45) Date of Patent: *Jun. 16, 2015

(54) PROCESSES FOR PREPARATION OF CYCLIC AND ACYCLIC DIENE COPOLYMER AND RUBBER COMPOSITION

(71) Applicant: Bridgestone Corporation, Tokyo (JP)

(72) Inventors: Zengquan Qin, Copley, OH (US); Eiju Suzuki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/223,413

(22) Filed: Mar. 24, 2014

(65) Prior Publication Data

US 2014/0288250 A1 Sep. 25, 2014

Related U.S. Application Data

(63) Continuation of application No. 13/501,206, filed as application No. PCT/US2010/052473 on Oct. 13, 2010, now Pat. No. 8,701,728.

(60) Provisional application No. 61/251,487, filed on Oct. 14, 2009.

(51) Int. Cl.
| | |
|---|---|
| C08F 4/52 | (2006.01) |
| C08F 4/70 | (2006.01) |
| C08F 232/06 | (2006.01) |
| C08F 4/80 | (2006.01) |
| C08F 36/04 | (2006.01) |
| C08L 9/00 | (2006.01) |
| C08L 21/00 | (2006.01) |
| B60C 1/00 | (2006.01) |
| B01J 31/12 | (2006.01) |

(52) U.S. Cl.
CPC ........... *C08F 4/80* (2013.01); *Y10T 152/10495* (2015.01); *B60C 1/00* (2013.01); *C08F 36/04* (2013.01); *C08F 232/06* (2013.01); *C08L 9/00* (2013.01); *C08L 21/00* (2013.01); *C08F 4/52* (2013.01)

(58) Field of Classification Search
CPC ............. C08F 4/52; C08F 4/70; C08F 232/06
USPC ................................. 526/133, 137, 164, 169.1
See application file for complete search history.

(56) References Cited

U.S. PATENT DOCUMENTS

| | | |
|---|---|---|
| 3,297,667 A | 1/1967 | Von Dohlen et al. |
| 3,541,063 A | 11/1970 | Throckmorton et al. |
| 3,723,400 A | 3/1973 | Dolgoplosk et al. |
| 3,740,382 A | 6/1973 | Dolgoplosk et al. |
| 3,794,604 A | 2/1974 | Throckmorton et al. |
| 4,020,251 A | 4/1977 | Hsieh |
| 4,107,081 A | 8/1978 | Halasa et al. |
| 4,113,930 A | 9/1978 | Moczygemba |
| 4,127,710 A | 11/1978 | Hsieh |
| 4,138,536 A | 2/1979 | Hsieh |
| 4,148,984 A | 4/1979 | Halasa et al. |
| 4,174,431 A | 11/1979 | Halasa et al. |
| 4,223,116 A | 9/1980 | Moczygemba et al. |
| 4,248,988 A | 2/1981 | Halasa |
| 4,264,753 A | 4/1981 | Halasa et al. |
| 4,444,903 A | 4/1984 | Carbonaro et al. |
| 4,461,883 A | 7/1984 | Takeuchi et al. |
| 4,520,123 A | 5/1985 | Hall |
| 4,591,624 A | 5/1986 | Hall |
| 4,699,960 A | 10/1987 | Gordini et al. |
| 5,017,539 A | 5/1991 | Jenkins et al. |
| 5,064,910 A | 11/1991 | Hattori et al. |
| 5,231,152 A | 7/1993 | Roggeman et al. |
| 5,248,722 A | 9/1993 | DeTrano et al. |
| 5,260,370 A | 11/1993 | Kang et al. |
| 5,331,036 A | 7/1994 | Kang et al. |
| 5,332,794 A | 7/1994 | Ohtsu et al. |
| 5,395,902 A | 3/1995 | Hall |
| 5,428,119 A | 6/1995 | Knauf et al. |
| 5,508,336 A | 4/1996 | Takeichi et al. |
| 5,844,050 A | 12/1998 | Fukahori et al. |
| 6,160,063 A | 12/2000 | Luo |
| 6,211,313 B1 | 4/2001 | Luo |
| 6,288,183 B1 | 9/2001 | Luo |

(Continued)

FOREIGN PATENT DOCUMENTS

| | | |
|---|---|---|
| EP | 0700938 A1 | 3/1996 |
| GB | 1027867 A | 4/1966 |

(Continued)

OTHER PUBLICATIONS

Adams, Florian, International Search Report with Written Opinion from PCT/US2010/052473 (9 pp.) Jan. 28, 2011.

Hong, Kunlun, et al.; Marcomolecules 2001, 34, 2482-2487; 1,3-Cyclohexadiene Polymers. 2. Near-Monodisperse Star and Star-Block Polymers Based on Poly(1,3-cyclohexadiene); 2001 American Chemical Society Published on Web on Mar. 13, 2001.

Li, Xiaofang, et al.; Cationic Rare-Earth Polyhydrido Complexes: Syntheisis, Structure, and Catallytic Activity for the cis-1,4-Selective Polymerization of 1,3-Cyclohexadiene; Angew Chem. Int. Ed. 2006, 45, 8184-888.

Longo, Pasquale, et al.; Highly Stereoregular Polymerization of 1, -Cyclohexadiene in the Presence of Cp2Ni-MAO Catalyst; Macromol. Chem. Phys. 2001, 202. No. 3, 409-412.

(Continued)

*Primary Examiner* — Fred M Teskin

(74) *Attorney, Agent, or Firm* — Meredith E. Hooker; Jenny L. Sheaffer

(57) ABSTRACT

A process for preparing a copolymer of an acyclic conjugated diene and a cyclic conjugated diene using a polymerization catalyst system comprising a transition metal compound or a lanthanide metal compound, an alkylating agent, and an inorganic halide alcoholate, and rubber compositions and tires comprising the same. The copolymer contains at least 90% acyclic conjugated diene monomer, has a number average molecular weight of between 40,000 and 300,000, and has a cis-bond content of at least 92%.

20 Claims, No Drawings

(56) References Cited

U.S. PATENT DOCUMENTS

| | | |
|---|---|---|
| 6,320,004 B1 | 11/2001 | Luo |
| 6,348,550 B1 | 2/2002 | Luo |
| 6,399,732 B2 | 6/2002 | Luo |
| 6,407,026 B2 | 6/2002 | Luo |
| 6,426,396 B2 | 7/2002 | Nakano et al. |
| 6,465,585 B2 | 10/2002 | Luo |
| 6,627,712 B2 | 9/2003 | Luo |
| 6,699,813 B2 | 3/2004 | Luo et al. |
| 6,699,941 B1 | 3/2004 | Handlin et al. |
| 6,765,066 B2 | 7/2004 | Ozawa |
| 6,838,526 B1 | 1/2005 | Sone et al. |
| 6,897,270 B2 | 5/2005 | Ozawa et al. |
| 6,977,281 B1 | 12/2005 | Ozawa et al. |
| 6,992,147 B1 | 1/2006 | Ozawa et al. |
| 6,995,228 B2 | 2/2006 | Shishido et al. |
| 7,094,849 B2 | 8/2006 | Luo et al. |
| 7,351,776 B2 | 4/2008 | Tartamella et al. |
| 7,442,748 B2 | 10/2008 | Cole et al. |
| 8,701,728 B2 * | 4/2014 | Qin et al. .................. 152/525 |
| 2007/0117942 A1 | 5/2007 | Luo |
| 2007/0161748 A1 | 7/2007 | Rademacher et al. |
| 2007/0232758 A1 | 10/2007 | Hou et al. |
| 2007/0276122 A1 | 11/2007 | Luo |
| 2008/0051519 A1 | 2/2008 | Luo et al. |
| 2008/0051552 A1 | 2/2008 | Luo et al. |
| 2008/0177017 A1 | 7/2008 | Suzuki et al. |
| 2009/0143551 A1 | 6/2009 | Qin et al. |

FOREIGN PATENT DOCUMENTS

| | | |
|---|---|---|
| GB | 1294167 A | 10/1972 |
| GB | 2044277 A | 10/1980 |
| JP | 07247321 A | 9/1995 |
| JP | 07247323 A | 9/1995 |
| JP | 07258362 A | 10/1995 |
| JP | 2004346140 A | 12/2004 |
| WO | 96/12744 A1 | 5/1996 |

OTHER PUBLICATIONS

Nakano, Mitsuru, et al.; Stereo-and regiospecific polymerization of cyclic conjugated dienes using highly active nickel catalysts; Chem. Commun., 2000, 2207-2208.

Natori, Itaru, et al.; Living Anionic Polymerization of 1,3-Cyclohexadiene with the n-Butyllithium /N,N,N',N'-Tetramethylethyethylenediamine Systme. Copolymerization and Block Copolymerization with Styrene, Butadiene, and Isoprene; Macromolecules 1998, 31, 982-987.

Natori, Itaru, et al., Anionic Polymerization of 1,3-Cyclohexadiene with Alkyllithium/Amine Systems. Characteristics of n-Butyllithium/N, N, N', N'-Tetramethylethylenediamine System for Living Anionic Polymerization; Macromolecules 1998, 31, 4687-4694.

Natori, Itaru; Synthesis of Polymers with an Alicyclic Structure in the Main Chain. Living Anionic Polymerixation of 1,3-Cyclohexadiene with the n-Butyllithium /N,N,N', N'-Tetramethylethylenediamine System; Macromolecules. vol. 30. No. 12, 1997, 3696-3697.

Po, Riccardo, et al.; Polymerization of 1,3-Cyclohexadiene with Nickel/MAO Catalytic Systems; Journal of Polymer Science: Part A: Polymer Chemistry, vol. 38, 3004-3009 (2000).

Williamson, David T., et al.; Synthesis and Characterization of Poly(1,3-cyclohexadiene) Homopolymers and Star-Shaped Polymers. Macromolecules vol. 34 No. 7, 2001 2108-2114.

Non-Final Office Action from U.S. Appl. No. 13/501,206 (dated May 30, 2013).

Response to Non-Final Office Action from U.S. Appl. No. 13/501,206, filed Aug. 30, 2013.

* cited by examiner

PROCESSES FOR PREPARATION OF CYCLIC AND ACYCLIC DIENE COPOLYMER AND RUBBER COMPOSITION

CROSS-REFERENCE TO RELATED APPLICATIONS

This application is a continuation of U.S. Non-Provisional application Ser. No. 13/501,206 now U.S. Pat. No. 8,701,728 B2, which has a 371(c) filing date of Jun. 26, 2012 and claims priority to and benefit of PCT Application No. PCT/US2010/052473 filed Oct. 13, 2010, which claims priority to and benefit of U.S. provisional application 61/251,487 filed Oct. 14, 2009, the entire disclosure of each which is incorporated by reference herein.

FIELD

One or more embodiments of the present application relate to processes for preparing copolymers of cyclic and acyclic conjugated diene monomers utilizing transition metal or lanthanide metal catalyst compositions, and rubber compositions incorporating such copolymers.

SUMMARY

The present application describes processes for preparing a copolymer of at least one acyclic conjugated diene and at least one cyclic conjugated diene using a polymerization catalyst system comprising (a) a transition metal compound or lanthanide metal compound, (b) an alkylating agent, and (c) an inorganic halide alcoholate, where the copolymer contains at least 90% acyclic conjugated diene monomer, has a number average molecular weight of between 40,000 and 300,000, and has a cis-bond content of at least 92%. Further, in one or more embodiments, the present application describes a rubber composition comprising at least 30 phr of at least one copolymer made by a process as previously described, and less than 70 phr of at least one rubber compound.

In one or more embodiments, the present application further describes a rubber composition comprising at least one copolymer comprising at least one cyclic conjugated diene monomer and at least one acyclic conjugated diene monomer, where the at least one copolymer contains at least 90% acyclic conjugated diene monomer, has a number average molecular weight of between 50,000 and 150,000, and has a cis-bond content of at least 92%, and at least one rubber compound.

In one or more embodiments, the present application further describes a pneumatic tire comprising a tread component, inner and outer sidewall components, and a casing component, where at least one of the components selected from the group consisting of inner and outer sidewall components and casing components comprises a copolymer prepared by a process as described herein.

DETAILED DESCRIPTION

According to one or more embodiments described in the present application, at least one acyclic conjugated diene monomer and at least one cyclic conjugated diene monomer can be polymerized using a polymerization catalyst system comprising (a) a transition metal compound or lanthanide metal compound, (b) an alkylating agent, and (c) an inorganic halide alcoholate to form a copolymer having a number average molecular weight of between 40,000 and 300,000, an acyclic conjugated diene monomer content of at least 90% and a cis-1,4 bond content of at least 92%.

Examples of the at least one acyclic conjugated diene monomer include, but are not limited to, 1,3 butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may be utilized in copolymerization.

Examples of the at least one cyclic conjugated diene monomer include, but are not limited to, 1,3-cyclopentadiene, 1,3-cyclohexadiene, 1,3-cycloheptadiene, and 1,3-cyclooctadiene, and derivatives thereof.

Practice of one or more embodiments described herein is not limited by the selection of any particular lanthanide metal compound or transition metal compound for use in the catalyst system.

In one or more embodiments, the catalyst system may include a lanthanide metal compound or transition metal compound, an alkylating agent, and a halogen-containing compound that includes one or more labile halogen atoms. Where the lanthanide metal compound or transition metal compound and/or alkylating agent include one or more labile halogen atoms, the catalyst system need not include a separate halogen-containing compound; e.g., the catalyst system may simply include a halogenated lanthanide or transition metal compound and an alkylating agent. In certain embodiments, the alkylating agent may include both an aluminoxane and at least one other organoaluminum compound. In yet other embodiments, a compound containing a non-coordinating anion, or a non-coordinating anion precursor, i.e. a compound that can undergo a chemical reaction to form a non-coordinating anion, may be employed in lieu of a halogen-containing compound that includes one or more labile halogen atoms. In these or other embodiments, other organometallic compounds, Lewis bases, and/or catalyst modifiers, may be employed in addition to the ingredients or components set forth above. For example, in one embodiment, a nickel-containing compound may be employed as a molecular weight regulator as disclosed in U.S. Pat. No. 6,699,813, which is incorporated herein by reference.

Various lanthanide metal compounds or transition metal compounds or mixtures thereof can be employed in the catalyst system. In one or more embodiments, these compounds may be soluble in hydrocarbon solvents such as aromatic hydrocarbons, aliphatic hydrocarbons, or cycloaliphatic hydrocarbons. In other embodiments, hydrocarbon-insoluble lanthanide or transition metal compounds, which can be suspended in the polymerization medium to form the catalytically active species, are also useful.

Lanthanide metal compounds useful in the catalyst system may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand. Preferably, lanthanum, samarium, or neodymium compounds may be used.

The lanthanide atom in the lanthanide metal compound(s) can be in various oxidation states including but not limited to the 0, +2, +3, and +4 oxidation states. Lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

The term organolanthanide compound may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Without wishing to limit the practice of the methods disclosed herein, the following discussion focuses on neodymium compounds, although those skilled in the art will be able to select similar lanthanide metal compounds that are based upon other lanthanide metals. Useful neodymium compounds include, but are not limited to, neodymium carboxylates, neodymium organophosphates, neodymium organophosphonates, neodymium organophosphinates, neodymium carbamates, neodymium dithiocarbamates, neodymium xanthates, neodymium β-diketonates, neodymium alkoxides, neodymium aryloxides, neodymium halides, neodymium pseudo-halides, and neodymium oxyhalides.

Neodymium carboxylates useful in the catalyst system disclosed herein include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a. neodymium versatate), neodymium naphthenate, neodymium stearate, neodymium oleate, neodymium benzoate, and neodymium picolinate.

Neodymium organophosphates useful in the catalyst system disclosed herein include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Neodymium organophosphonates useful in the catalyst system disclosed herein include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-non ylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Neodymium organophosphinates useful in the catalyst system disclosed herein include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium (1-methylheptyl) (2-ethylhexyl)phosphinate, and neodymium (2-ethylhexyl) (p-nonylphenyl)phosphinate.

Neodymium carbamates useful in the catalyst system disclosed herein include, but are not limited to, neodymium dimethylcarbamate, neodymium diethylcarbamate, neodymium diisopropylcarbamate, neodymium dibutylcarbamate, and neodymium dibenzylcarbamate.

Neodymium dithiocarbamates useful in the catalyst system disclosed herein include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Neodymium xanthates useful in the catalyst system disclosed herein include, but are not limited to, neodynium methylxanthate, neodymium ethylxanthate, neodymium isopropylxanthate, neodymium butylxanthate, and neodymium benzylxanthate.

Neodymium β-diketonates useful in the catalyst system disclosed herein include, but are not limited to, neodymium acetyl acetonate, neodymium trifluoroacetylacetonate, neodymium hexafluoroacetylacetonate, neodynium benzoylacetonate, and neodymium 2,2,6,6-tetramethyl-3,5-heptanedionate.

Neodymium alkoxides or aryloxides useful in the catalyst system disclosed herein include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Neodymium halides useful in the catalyst system disclosed herein include, but are not limited to, neodymium fluoride, neodymium chloride, neodymium bromide, and neodymium iodide.

Neodymium pseudo-halides useful in the catalyst system disclosed herein include, but are not limited to, neodymium cyanide, neodymium cyanate, neodymium thiocyanate, neodymium azide, and neodymium ferrocyanide.

Neodymium oxyhalides useful in the catalyst system disclosed herein include, but are not limited to, neodymium oxyfluoride, neodymium oxychloride, and neodymium oxybromide. Where neodymium halides, neodymium oxyhalides, or other neodymium compounds include one or more labile halogen atoms, the catalyst system need not include a separate halogen-containing compound. A Lewis base such as tetrahydrofuran (THF) may be employed as an aid for solubilizing this class of neodymium compounds in inert organic solvents.

Transition metal compounds useful in the catalyst system may include at least one atom from the first or second series transition metals. Preferably, nickel, cobalt, or palladium compounds may be used. In certain embodiments, the transition metal compound comprises a nickel-containing compound. In certain embodiments, the transition metal compound comprises a compound selected from the group consisting of nickel benzoate, nickel acetate, nickel naphthenate, nickel octanoate, nickel neodecanoate, bis(α-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis($\eta^3$-allyl)nickel, bis(π-cyclocta-1,5-diene)nickel, bis($\eta^3$-allyl nickel trifluoroacetate), nickel tetracarbonyl, nickel boroacylate, nickel neodecanoate borate, nickel hexanoate borate, nickel naphthenate borate, nickel stearate borate, nickel octoate borate, nickel 2-ethylhexanoate borate, and mixtures thereof.

The transition metal atom in the transition metal compounds can be in various oxidation states including but not limited to the 0, +2, +3, and +4 oxidation states. Transition metal compounds include, but are not limited to, metal carboxylates, metal carboxylate borates, metal organophosphates, metal organophosphonates, metal organophosphinates, metal carbamates, metal dithiocarbamates, metal xanthates, metal β-diketonates, metal alkoxides or aryloxides, metal halides, metal pseudo-halides, metal oxyhalides, and organometal compounds.

Without wishing to limit the practice of the methods disclosed herein, the following discussion focuses on nickel compounds, although those skilled in the art will be able to select similar compounds that are based upon other transition metals. Useful nickel compounds include, but are not limited to, nickel carboxylates, nickel carboxylate borates, nickel organophosphates, nickel organophosphonates, nickel organophosphinates, nickel carbamates, nickel dithiocarbamates, nickel xanthates, nickel β-diketonates, nickel alkoxides, nickel aryloxides, nickel halides, nickel pseudo-halides, nickel oxyhalides, and organonickel compounds.

Nickel carboxylates useful in the catalyst system disclosed herein include, but are not limited to, nickel formate, nickel acetate, nickel acrylate, nickel methacrylate, nickel valerate, nickel gluconate, nickel citrate, nickel fumarate, nickel lactate, nickel maleate, nickel oxalate, nickel 2-ethylhexanoate, nickel neodecanoate, nickel naphthenate, nickel stearate, nickel oleate, nickel benzoate, and nickel picolinate.

Nickel carboxylate borates useful in the catalyst system disclosed herein include, but are not limited to, compounds defined by the formulae $(RCOONiO)_3B$ or $(RCOONiO)_2B(OR)$, where each R, which may be the same or different, is a hydrogen atom or a mono-valent organic group. In one embodiment, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. Nickel carboxylate borate may include those disclosed in U.S. Pat. No. 4,522,988, which is incorporated herein by reference. Specific examples of nickel carboxylate borate include nickel(II) neodecanoate borate, nickel(II) hexanoate borate, nickel(II) naphthenate borate, nickel(II) stearate borate, nickel(II) octoate borate, nickel(II) 2-ethylhexanoate borate, and mixtures thereof.

Nickel organophosphates useful in the catalyst system disclosed herein include, but are not limited to, nickel dibutyl phosphate, nickel dipentyl phosphate, nickel dihexyl phosphate, nickel diheptyl phosphate, nickel dioctyl phosphate, nickel bis(1-methylheptyl) phosphate, nickel bis(2-ethylhexyl)phosphate, nickel didecyl phosphate, nickel didodecyl phosphate, nickel dioctadecyl phosphate, nickel dioleyl phosphate, nickel diphenyl phosphate, nickel bis(p-nonylphenyl) phosphate, nickel butyl (2-ethylhexyl)phosphate, nickel (1-methylheptyl) (2-ethylhexyl) phosphate, and nickel (2-ethylhexyl) (p-nonylphenyl) phosphate.

Nickel organophosphonates useful in the catalyst system disclosed herein include, but are not limited to, nickel butyl phosphonate, nickel pentyl phosphonate, nickel hexyl phosphonate, nickel heptyl phosphonate, nickel octyl phosphonate, nickel (i-methylheptyl)phosphonate, nickel (2-ethylhexyl)phosphonate, nickel decyl phosphonate, nickel dodecyl phosphonate, nickel octadecyl phosphonate, nickel oleyl phosphonate, nickel phenyl phosphonate, nickel (p-nonylphenyl)phosphonate, nickel butyl butylphosphonate, nickel pentyl pentylphosphonate, nickel hexyl hexylphosphonate, nickel heptyl heptylphosphonate, nickel octyl octylphosphonate, nickel (1-methylheptyl) (1-methylheptyl) phosphonate, nickel (2-ethylhexyl) (2-ethylhexyl)phosphonate, nickel decyl decylphosphonate, nickel dodecyl dodecylphosphonate, nickel octadecyl octadecylphosphonate, nickel oleyl oleylphosphonate, nickel phenyl phenylphosphonate, nickel (p-nonylphenyl) (p-nonylphenyl)phosphonate, nickel butyl (2-ethylhexyl)phosphonate, nickel (2-ethylhexyl) butylphosphonate, nickel (1-methylheptyl) (2-ethylhexyl)phosphonate, nickel (2-ethylhexyl) (1-methylheptyl)phosphonate, nickel (2-ethylhexyl) (p-nonylphenyl) phosphonate, and nickel (p-nonylphenyl) (2-ethylhexyl) phosphonate.

Nickel organophosphinates useful in the catalyst system disclosed herein include, but are not limited to, nickel butylphosphinate, nickel pentylphosphinate, nickel hexylphosphinate, nickel heptylphosphinate, nickel octylphosphinate, nickel (1-methylheptyl)phosphinate, nickel (2-ethylhexyl)phosphinate, nickel decylphosphinate, nickel dodecylphosphinate, nickel octadecylphosphinate, nickel oleylphosphinate, nickel phenylphosphinate, nickel (p-nonylphenyl)phosphinate, nickel dibutylphosphinate, nickel dipentylphosphinate, nickel dihexylphosphinate, nickel diheptylphosphinate, nickel dioctylphosphinate, nickel bis(1-methylheptyl)phosphinate, nickel bis(2-ethylhexyl)phosphinate, nickel didecylphosphinate, nickel didodecylphosphinate, nickel dioctadecylphosphinate, nickel dioleylphosphinate, nickel diphenylphosphinate, nickel bis(p-nonylphenyl)phosphinate, nickel butyl(2-ethylhexyl)phosphinate, nickel (1-methylheptyl)(2-ethylhexyl)phosphinate, and nickel (2-ethylhexyl)(p-nonylphenyl)phosphinate.

Nickel carbamates useful in the catalyst system disclosed herein include, but are not limited to, nickel dimethylcarbamate, nickel diethylcarbamate, nickel diisopropylcarbamate, nickel dibutylcarbamate, and nickel dibenzylcarbamate.

Nickel dithiocarbamates useful in the catalyst system disclosed herein include, but are not limited to, nickel dimethyldithiocarbamate, nickel diethyldithiocarbamate, nickel diisopropyldithiocarbamate, nickel dibutyldithiocarbamate, and nickel dibenzyldithiocarbamate.

Nickel xanthates useful in the catalyst system disclosed herein include, but are not limited to, nickel methylxanthate, nickel ethylxanthate, nickel isopropylxanthate, nickel butylxanthate, and nickel benzylxanthate.

Nickel β-diketonates useful in the catalyst system disclosed herein include, but are not limited to, nickel acetylacetonate, nickel trifluoroacetylacetonate, nickel hexafluoroacetylacetonate, nickel benzoylacetonate, and nickel 2,2,6,6-tetramethyl-3,5-heptanedionate.

Nickel alkoxides or aryloxides useful in the catalyst system disclosed herein include, but are not limited to, nickel methoxide, nickel ethoxide, nickel isopropoxide, nickel 2-ethylhexoxide, nickel phenoxide, nickel nonylphenoxide, and nickel naphthoxide.

Nickel halides useful in the catalyst system disclosed herein include, but are not limited to, nickel fluoride, nickel chloride, nickel bromide, and nickel iodide.

Nickel pseudo-halides useful in the catalyst system disclosed herein include, but are not limited to, nickel cyanide, nickel cyanate, nickel thiocyanate, nickel azide, and nickel ferrocyanide.

Nickel oxyhalides useful in the catalyst system disclosed herein include, but are not limited to, nickel oxyfluoride, nickel oxychloride and nickel oxybromide. Where the nickel halides, nickel oxyhalides or other nickel-containing compounds include one or more labile halogen atoms, the catalyst system need not include a separate halogen-containing compound. A Lewis base such as an alcohol can be used as a solubility aid for this class of compounds.

The term organonickel compound may refer to any nickel compound containing at least one nickel-carbon bond. Organonickel compounds useful in the catalyst system disclosed herein include, but are not limited to, bis(cyclopentadienyl)nickel (also called nickelocene), bis(pentamethylcyclopentadienyl)nickel (also called decamethylnickelocene), bis(tetramethylcyclopentadienyl)nickel, bis(ethylcyclopentadienyl)nickel, bis(isopropylcyclopentadienyl)nickel, bis(pentadienyl)nickel, bis(2,4-dimethylpentadienyl)nickel, (cyclopentadienyl)(pentadienyl)nickel, bis(1,5-cyclooctadiene)nickel, bis(allyl)nickel, bis(methallyl)nickel, and bis(crotyl)nickel.

Various alkylating agents, or mixtures thereof, can be used. Alkylating agents, which may also be referred to as hydrocarbylating agents, useful in the catalyst system disclosed herein include, but are not limited to, organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes a labile halogen atom, the alkylating agent may also serve as the halogen-containing compound.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds useful in the catalyst system disclosed herein include, but are not limited to, those represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms.

Organoaluminum compounds useful in the catalyst system disclosed herein include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds useful in the catalyst system disclosed herein include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds useful in the catalyst system disclosed herein include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propyl aluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides useful in the catalyst system disclosed herein include, but are not limited to, ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds useful in the catalyst system disclosed herein include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethyl aluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichloride useful in the catalyst system disclosed herein include, but are not limited to, ethylaluminum dichloride, n-propylaluminum dichloride, isopropyl aluminum dichloride, n-butylaluminum dichloride, isobutylaluminum dichloride, and n-octyl aluminum dichloride.

Other organoaluminum compounds useful in the catalyst system disclosed herein include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds includes aluminoxanes. Aluminoxanes useful in the catalyst system disclosed herein include, but are not limited to, oligomeric linear aluminoxanes that can be represented by the general formula:

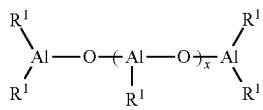

and oligomeric cyclic aluminoxanes that can be represented by the general formula:

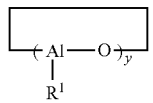

where x may be an integer of 1 to about 100, and in other embodiments about 10 to about 50; y may be an integer of 2 to about 100, and in other embodiments about 3 to about 20; and where each $R_1$, which may be the same or different, may be a mono-valent organic group that is attached to the aluminum atom via a carbon atom. In one or more embodiments, each $R_1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds useful in the catalyst system disclosed herein include, but are not limited to, methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methyl aluminoxane and at least one other organoaluminum compound (e.g., $AlR_nX_{3-n}$) such as diisobutylaluminum hydride are employed in combination.

As discussed above, the alkylating agent of the catalyst system may include an organomagnesium compound. The term organomagnesium compound may refer to any magnesium compound that contains at least one magnesium-carbon bond. Organomagnesium compounds may be soluble in a hydrocarbon solvent. One class of organomagnesium compounds that can be utilized may be represented by the formula $MgR_2$, where each R, which may be the same or different, is a mono-valent organic group, with the proviso that the group is attached to the magnesium atom via a carbon atom. In one or more embodiments, each R may be a hydrocarbyl group, and the resulting organomagnesium compounds are dihydrocarbylmagnesium compounds. Examples of the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but are not limited to, nitrogen, oxygen, silicon, sulfur, and phosphorus atom.

Examples of dihydrocarbylmagnesium compounds useful in the catalyst system disclosed herein include, but are not limited to, diethylmagnesium, di-n-propylmagnesium, diisopropylmagnesium, dibutylmagnesium, dihexylmagnesium, diphenylmagnesium, dibenzylmagnesium, and mixtures thereof.

Another class of organomagnesium compounds that can be utilized include those that may be represented by the formula RMgX, where R is a mono-valent organic group, with the proviso that the group is attached to the magnesium atom via a carbon atom, and X is a hydrogen atom, a halogen atom, a carboxylate group, an alkoxide group, or an aryloxide group. In one or more embodiments, R may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, boron, silicon, sulfur, and phosphorus atoms. In one or more embodiments, X is a carboxylate group, an alkoxide group, or an aryloxide group.

Exemplary types of organomagnesium compounds that can be represented by the formula RMgX include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Specific examples of organomagnesium compounds that may be represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various halogen-containing compounds, or mixtures thereof, that contain one or more labile halogen atoms can be employed in the catalyst system. Examples of halogen atoms include, but are not limited to, fluorine, chlorine, bromine, and iodine. A combination of two or more halogen-containing compounds having different or the same halogen atoms can also be utilized. In one or more embodiments, the halogen-containing compounds may be soluble in a hydrocarbon solvent. In other embodiments, hydrocarbon-insoluble halogen-containing compounds, which can be suspended in the polymerization medium to form the catalytically active species, may be useful.

Suitable types of halogen-containing compounds include, but are not limited to, elemental halogens, mixed halogens, hydrogen halides, organic halides, inorganic halides, inorganic halide alcoholates, metallic halides, organometallic halides, and mixtures thereof.

Elemental halogens useful in the catalyst system disclosed herein include, but are not limited to, fluorine, chlorine, bromine, and iodine.

Mixed halogens useful in the catalyst system disclosed herein include, but are not limited to, iodine monochloride, iodine monobromide, iodine trichloride, and iodine pentafluoride.

Hydrogen halides useful in the catalyst system disclosed herein include, but are not limited to, hydrogen fluoride, hydrogen chloride, hydrogen bromide, and hydrogen iodide.

Organic halides useful in the catalyst system disclosed herein include, but are not limited to, t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides useful in the catalyst system disclosed herein include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Inorganic halide alcoholates useful in the catalyst system disclosed herein include, but are not limited to, boron trifluoride alcoholates, where the alcoholate portion contains between 4 and 20 carbon atoms.

Metallic halides useful in the catalyst system disclosed herein include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides useful in the catalyst system disclosed herein include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

As discussed above, in certain embodiments, a compound containing a non-coordinating anion, or a non-coordinating anion precursor, i.e., a compound that can undergo a chemical reaction to for a non-coordinating anion, may be employed in lieu of a halogen-containing compound that includes one or more labile halogen atoms. Compounds containing non-coordinating anions are known in the art. In general, non-coordinating anions are sterically bulky anions that do not form coordinate bonds with, for example, the active center of a catalyst system, due to steric hindrance. Exemplary non-coordinating anions include tetraarylborate anions, and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

The foregoing catalyst systems may have high catalytic activity for polymerizing conjugated dienes into stereospecific polydienes over a wide range of catalyst concentrations and catalyst ingredient ratios. It is believed that the catalyst ingredients may interact to form an active catalyst species. It is also believed that the optimum concentration for any one catalyst ingredient may be dependent upon the concentrations of the other catalyst ingredients.

In one or more embodiments, the molar ratio of the alkylating agent to the lanthanide or transition metal compound (alkylating agent/metal) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide or transition metal compound (aluminoxane/metal) can be varied from about 5:1 to about 1,000:1, in other embodiments from about 10:1 to about 700:1, and in other embodiments from about 20:1 to about 500:1; and the molar ratio of the at least one other organoaluminum compound to the lanthanide or transition metal compound (Al/metal) can be varied from about 1:1 to about 200:1, in other embodiments from about 2:1 to about 150:1, and in other embodiments from about 5:1 to about 100:1.

The molar ratio of the halogen-containing compound to the lanthanide or transition metal compound is best described in terms of the ratio of the moles of halogen atoms in the halogen-containing compound to the moles of lanthanide or transition metal atoms in the lanthanide or transition metal compound (halogen/lanthanide or halogen/transition). In one or more embodiments, the halogen/lanthanide molar ratio can be varied from about 0.5:1 to about 20:1, in other embodiments from about 1:1 to about 10:1, and in other embodiments from about 2:1 to about 6:1. In one or more embodiments, the halogen/transition molar ratio can be varied from about 0.5:1 to about 100:1, in other embodiments from about 1:1 to about 60:1, and in other embodiments from about 3:1 to about 40:1.

In yet another embodiment, the molar ratio of the non-coordinating anion or non-coordinating anion precursor to the lanthanide or transition metal compound (An/metal) may be from about 0.5:1 to about 20:1, in other embodiments from about 0.75:1 to about 10:1, and in other embodiments from about 1:1 to about 6:1.

The catalyst system may be formed by combining or mixing the catalyst ingredients. Although an active catalyst species is believed to result from this combination, the degree of interaction or reaction between the various ingredients or components is not known with any great degree of certainty. Therefore, the term "catalyst system" has been employed to encompass a simple mixture of the ingredients, a complex of the various ingredients that is caused by physical or chemical forces of attraction, a chemical reaction product of the ingredients, or a combination of the foregoing.

The catalyst systems utilized in the methods disclosed herein can be formed by various methods.

In one embodiment, the catalyst system may be formed in situ by adding the catalyst ingredients to a solution containing monomer and solvent, or simply bulk monomer, in either a stepwise or simultaneous manner. In one embodiment, the alkylating agent can be added first, followed by the lanthanide or transition metal compound, and then followed by the halogen-containing compound, if used, or by the compound containing a non-coordinating anion or the non-coordinating anion precursor.

In another embodiment, the catalyst ingredients may be pre-mixed outside the polymerization system at an appropriate temperature, which may be from about −20° C. to about 80° C., and the resulting catalyst system may be aged for a period of time ranging from a few minutes to a few days and then added to the monomer solution.

In yet another embodiment, the catalyst system may be pre-formed in the presence of at least one conjugated diene monomer. That is, the catalyst ingredients may be pre-mixed in the presence of a small amount of conjugated diene monomer at an appropriate temperature, which may be from about −20° C. to about 80° C. The amount of conjugated diene monomer that may be used for pre-forming the catalyst system can range from about 1 to about 500 moles per mole, in other embodiments from about 5 to about 250 moles per mole, and in other embodiments from about 10 to about 100 moles per mole of the lanthanide or transition metal compound. The resulting catalyst system may be aged for a period of time ranging from a few minutes to a few days and then added to the remainder of the conjugated diene monomer that is to be polymerized.

And in yet another embodiment, the catalyst system may be formed by using a two-stage procedure. The first stage may involve combining the alkylating agent with the lanthanide or transition metal compound in the absence of conjugated diene monomer or in the presence of a small amount of conjugated diene monomer at an appropriate temperature, which may be from about −20° C. to about 80° C. In the second stage, the foregoing reaction mixture and the halogen-containing compound, non-coordinating anion, or non-coordinating anion precursor can be charged in either a stepwise or simultaneous manner to the remainder of the conjugated diene monomer that is to be polymerized.

When a solution of the catalyst system or one or more of the catalyst ingredients is prepared outside the polymerization system as set forth in the foregoing methods, an organic solvent or carrier may be employed. The organic solvent may serve to dissolve the catalyst system or ingredients, or the solvent may simply serve as a carrier in which the catalyst system or ingredients may be suspended. The organic solvent may be inert to the catalyst system. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used.

The production of polymer can be accomplished by polymerizing acyclic and cyclic conjugated diene monomers in the presence of a catalytically effective amount of the foregoing catalyst system. The total catalyst concentration to be employed in the polymerization mass may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide or transition metal compound used can be varied from about 0.01 to about 2 mmol, in other embodiments from about 0.02 to about 1 mmol, and in other embodiments from about 0.05 to about 0.5 mmol per 100 g of conjugated diene monomers.

The polymerization can be carried out in an organic solvent as the diluent. In one embodiment, a solution polymerization system can be employed, which is a system where the monomer to be polymerized and the polymer formed are soluble in the polymerization medium. Alternatively, a precipitation polymerization system may be employed by choosing a solvent in which the polymer formed is insoluble. In both cases, the monomer to be polymerized may be in a condensed phase. Also, the catalyst ingredients may be solubilized or suspended within the organic solvent. In these or other embodiments, the catalyst ingredients or components are unsupported or not impregnated onto a catalyst support. In other embodiments, the catalyst ingredients or components may be supported.

In performing these polymerizations, an amount of organic solvent in addition to the amount of organic solvent that may be used in preparing the catalyst system may be added to the polymerization system. The additional organic solvent may be the same as or different from the organic solvent used in preparing the catalyst system. An organic solvent that is inert with respect to the catalyst system employed to catalyze the polymerization may be selected. Exemplary hydrocarbon solvents have been set forth above. When a solvent is employed, the concentration of the monomer to be polymerized may not be limited to a special range. In one or more embodiments, however, the concentration of the monomer present in the polymerization medium at the beginning of the polymerization can be in a range of from about 3% to about 80% by weight, in other embodiments from about 5% to about 50% by weight, and in other embodiments from about 10% to about 30% by weight.

The polymerization of conjugated dienes may also be carried out by means of bulk polymerization, which refers to a polymerization environment where substantially no solvents are employed. The bulk polymerization can be conducted either in a condensed liquid phase or in a gas phase.

The polymerization of conjugated dienes may be carried out as a batch process, a continuous process, or a semi-continuous process. In the semi-continuous process, monomer may be intermittently charged as needed to replace that monomer already polymerized. In any case, the polymerization may be conducted under anaerobic conditions by using an inert protective gas such as nitrogen, argon or helium, with moderate to vigorous agitation. The polymerization temperature may vary widely from a low temperature, such as $-10°$ C. or below, to a high temperature such as $100°$ C. or above. In one embodiment, the polymerization temperature may be from about $20°$ C. to about $90°$ C. The heat of polymerization may be removed by external cooling (e.g., with a thermally controlled reactor jacket), internal cooling (e.g., by evaporation and condensation of the monomer or the solvent through the use of a reflux condenser connected to the reactor), or a combination of the methods. Although the polymerization pressure employed may vary widely, a pressure range of from about 1 atmosphere to about 10 atmospheres may be maintained.\

Once a desired conversion is achieved, the polymerization can be stopped by adding a quenching agent to the polymerization mixture in order to inactivate the catalyst. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer.

The number average molecular weight (Mn) of the poly(cyclic/acyclic)diene copolymers described herein may be from 40,000 to 300,000, in other embodiments from 50,000 to 150,000, as determined by using gel permeation chromatography (GPC) with polybutadiene standards. In one or more embodiments, the molecular weight distribution (Mw/Mn) (also known as "polydispersity index") of these polymers may be less 5 and greater than 2.

The cis-1,4-linkage content of the poly(cyclic/acyclic)diene copolymers described herein is greater than 60%, in other embodiments greater than 75%, in other embodiments greater than 92%, and in other embodiments greater than 95%. The cis-1,4-linkage content can be determined by infrared spectroscopy.

The acyclic conjugated diene monomer content of the poly(cyclic/acyclic)diene copolymers described herein may be above 70%, in other embodiments above 90%.

The poly(cyclic/acyclic)diene copolymers disclosed herein are particularly useful in preparing tire components. These tire components can be prepared by using the copolymers disclosed herein alone or together with rubbery polymers (rubber compounds) to prepare a rubber composition. Other rubbery polymers that may be used along with the polycyclic/acyclic) diene copolymers disclosed herein include natural and synthetic elastomers. The synthetic elastomers typically derive from the polymerization of acyclic conjugated diene monomers. These acyclic conjugated diene monomers may be copolymerized with other monomers such as vinyl aromatic monomers. Other rubbery polymers may derive from the polymerization of ethylene together with one or more α-olefins and optionally one or more diene monomers.

The rubber compositions useful in preparing tire components described herein may comprise at least one rubber compound and at least one copolymer comprising at least one cyclic conjugated diene monomer and at least one acyclic conjugated diene monomer, where the at least one copolymer contains at least 90% acyclic conjugated diene monomer, has a number average molecular weight of between 50,000 and 150,000, and has a cis-bond content of at least 92%. In one embodiment, the rubber composition comprises at least 30 parts-per-hundred-rubber (phr) of the at least one copolymer. In another embodiment, the rubber composition comprises between 40 and 60 phr of the at least one copolymer.

Useful rubber compounds include natural rubber, synthetic polyisoprene, polybutadiene, polyisobutylene-co-isoprene, neoprene, styrene-butadiene copolymer (solution and/or emulsion polymerized), poly(ethylene-co-propylene), poly (styrene-co-butadiene), poly(styrene-co-isoprene), and poly (styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added to the rubber composition.

The rubber compositions may optionally include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in Kirk-Othmer, ENCYCLOPEDIA OF CHEMICAL TECHNOLOGY, Vol. 30, pgs. 365-468, ($3^{rd}$ Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, ($2^{nd}$ Ed. 1989), which are incorporated herein by reference. Vulcanizing agents may be used alone or in combination. In one or more embodiments, the preparation of vulcanizable compositions and the construction and curing of the tire is not affected by the practice of this invention.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components including but not limited to treads, sidewalls, casing components (e.g., body ply skins, bead filler), and the like. Preferably, the poly(cyclic/acyclic)diene copolymers are employed in sidewall or casing component formulations. In one or more embodiments, these formulations may include at least 30 phr, in other embodiments between 40 and 60 phr, of the poly(cyclic/acyclic)diene copolymers.

In one or more embodiments, the rubber composition may be prepared by forming an initial masterbatch that includes the rubber component and filler (the rubber component optionally including the poly(cyclic/acyclic)diene copolymer disclosed herein). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functionalized copolymer disclosed herein can be added during these remills. Rubber compounding techniques and the additives employed therein are generally known as disclosed in The Compounding and Vulcanization of Rubber, in Rubber Technology ($2^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized copolymer disclosed herein and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional. polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

The embodiments disclosed herein will be more readily understood by reference to the following examples. There are, of course, many other embodiments or illustrations which will become apparent to one skilled in the art, and it will accordingly be recognized that these examples are given for the purpose of illustration only, and are not to be construed as limiting the scope of the claims in any way.

EXAMPLES

Example 1

Synthesis of cis-1,4-polybutadiene (Control Polymer 1)

To a dry bottle purged with nitrogen was added hexane and a 1,3-butadiene (Bd)/hexane blend, resulting in 300 g of 15.0% (by weight) Bd solution in hexane. To the solution was charged a triisobutylaluminum (TIBA) solution (0.68M, 1.35 mL), nickel octanoate (Ni[EHA]$_2$) solution (0.050M, 0.61 mL) and boron trifluoride hexanolate (BF$_3$*C$_6$H$_{13}$OH) solution (1.0M, 1.10 mL). The bottle was placed in an 80° C. water bath and tumbled for one hour. Then the reaction mixture was treated with isopropanol containing 2,6-di-tert-butyl-4-methylphenol (BHT) in order to deactivate the catalyst, and coagulate and stabilize the polymer. The polybutadiene was then dried in a drum dryer at 120° C., and its properties were listed in Table 1.

Example 2

Synthesis of cis-1,4-polybutadiene (Control Polymer 2)

Control Polymer 2 was prepared using a similar procedure as in Example 1. The polymerization conditions and resulting polymer properties were listed in Table 1.

Example 3

Synthesis of cis-1,4-poly(Bd-co-CHD)

To a dry bottle purged with nitrogen was added hexane (103.6 g), 1,3-butadiene (Bd)/hexane blend (22.2%, 194.6 g) and 1,3-cyclohexadiene (1.8 g), resulting in 300 g of a 15.0% monomer solution in hexane. To the solution was charged a preformed catalyst made in the order of: Bd blend (1.1 g), TIBA solution (0.68M, 0.99 mL), Ni[EHA]$_2$ solution (0.050M, 0.45 mL), and $BF_3*C_6H_{13}OH$ solution (1.0M, 0.81 mL). The bottle was placed in a 65° C. water bath and tumbled for 2.5 hours. Then the reaction mixture was treated with isopropanol containing 2,6-di-tert-butyl-4-methylphenol (BHT) in order to deactivate the catalyst, and coagulate and stabilize the polymer. The resulting polymer (polymer 3) was then dried in a drum dryer at 120° C., and its properties were listed in Table 1.

Example 4

Synthesis of cis-1,4-poly(Bd-co-CHD)

The copolymer was prepared using a similar procedure as in Example 3. The polymerization conditions and resulting polymer (polymer 4) properties were listed in Table 1.

Example 5

Synthesis of cis-1,4-poly(Bd-co-CHD)

The copolymer was prepared using a similar procedure as in Example 3. The polymerization conditions and resulting polymer (polymer 5) properties were listed in Table 1.

Example A

Crack growth testing of cis-1,4-poly(Bd-co-CHD)

Polymer 3 (containing 2.3 wt % of CHD) was used as "Diene Polymer Sample" in Table 2. Mooney viscosity measurement was conducted according to ASTM D-1646-89. Mixed rubber stock was cured at 145 C for 33 min. Dc/Dn (crack length per cycle) and tearing energy were measured over $250 \times 10^3$ cycles (5 cycles/sec) at 10% strain (40 Hz pulse deformation) condition, by using an MTS 810 Elastomer Test System. The resulting properties were summarized in Table 3.

Example B

Same as Example A, but polymer 4 (containing 3.5 wt % of CHD) was used instead of polymer 3. The resulting properties were summarized in Table 3.

Example C

Same as Example A, but polymer 5 (containing 5.4 wt % of CHD) was used instead of polymer 3. The resulting properties were summarized in Table 3.

TABLE 1

| Polymer Type | Ni-BR | | Poly(Bd-co-CHD) | | |
|---|---|---|---|---|---|
| Bd/CHD, wt ratio | 100/0 | 100/0 | 96/4 | 96/4 | 92/8 |
| $Ni[EHA]_2$, mmol/hgm | 0.068 | 0.068 | 0.050 | 0.050 | 0.050 |
| TIBA/Ni, molar ratio | 30.0 | 30.0 | 30.0 | 45.0 | 30.0 |
| $BF_3$/Al, molar ratio | 1.2 | 1.3 | 1.2 | 1.2 | 1.2 |
| Reaction Temperature, ° C. | 80.0 | 65.0 | 65.0 | 65.0 | 65.0 |
| Reaction time, h | 1.0 | 1.0 | 2.5 | 2.5 | 2.5 |
| Yield, % | 95.0% | 94.2% | 82.4% | 87.0% | 71.5% |
| ML1 + 4 @ 100 C. | 34.60 | 45.50 | 44.30 | 35.40 | 32.50 |
| T80 | 4.28 | 5.20 | 3.77 | 3.01 | 3.13 |
| Mn | 64,953 | 80,978 | 70,334 | 69,027 | 66,207 |
| Mw | 253,637 | 294,804 | 301,635 | 258,499 | 257,754 |
| Mp | 183,851 | 300,670 | 269,882 | 195,759 | 168,823 |
| Mw/Mn | 3.9049 | 3.6405 | 4.2886 | 3.7449 | 3.8932 |
| Tg, ° C. | −105.00 | −105.43 | −103.71 | −103.62 | −103.16 |
| Tm, ° C. | −7.98 | −8.03 | −9.36 | −10.30 | −11.96 |
| CHD, wt % | 0.0% | 0.0% | 2.3% | 3.5% | 5.4% |
| Cis-1,4 % (Bd = 100) | 96.08% | 96.80% | 97.07% | 97.09% | 97.05% |
| trans-1,4 % | 1.92% | 1.49% | 1.44% | 1.29% | 1.56% |
| Vinyl % | 2.01% | 1.71% | 1.49% | 1.62% | 1.39% |

Rubber Composition

The polymers obtained from Examples 1-5 were compounded in a 300 gram mixer, using a black sidewall type formulation according to the recipe shown in Table 2.

TABLE 2

| Ingredient | Parts per 100 rubber |
|---|---|
| Diene Polymer Sampe | 60 |
| Natural Rubber | 40 |
| Carbon Black (FEF grade) | 55 |
| Process Oil (napthenic oil) | 13 |
| Stearic Acid | 1.5 |
| Wax (microcrystalline) | 4 |
| Anti-Oxidant (6PPD) | 3 |
| Zinc Oxide | 3 |
| Accelerator (TBBS) | 0.8 |
| Accelerator (TMQ) | 3 |
| Sulfur | 2.6 |

Example D

Comparative

Same as Example A, but polymer 1 was used instead of polymer 3. The resulting properties were summarized in Table 3.

Example E

Comparative

Same as Example A, but polymer 2 was used instead of polymer 3. The resulting properties were summarized in Table 3.

TABLE 3

| Example | Mooney Viscosity | Tearing Energy ($J/m^2$) | Dc/Dn (nm/cycle) |
|---|---|---|---|
| A | 40.3 | 1547 | 12.2 |
| B | 37.0 | 1519 | 9.6 |

TABLE 3-continued

| Example | Mooney Viscosity | Tearing Energy (J/m$^2$) | Dc/Dn (nm/cycle) |
|---|---|---|---|
| C | 33.8 | 1509 | 6.0 |
| D | 33.3 | 1459 | 18.0 |
| E | 39.8 | 1606 | 18.3 |

As illustrated by Table 3, the CHD copolymer has better crack growth resistance in comparison to the control NiBR. Examples A, B, and C resulted in better crack growth resistance even having comparable Mooney viscosity and tearing energy as Examples D and E. Also, Example C (sample with the highest CHD content) exhibited the best resistance to crack growth.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A *Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

We claim:

1. A process for preparing a copolymer of an acyclic conjugated diene and a cyclic conjugated diene using a polymerization catalyst system, comprising:
    polymerizing at least one acyclic conjugated diene monomer with at least one cyclic conjugated diene monomer utilizing a polymerization catalyst system comprising
    (a) a transition metal compound or a lanthanide metal compound,
    (b) an alkylating agent; and
    (c) an inorganic halide alcoholate,
    wherein the resulting copolymer contains at least 90% acyclic conjugated diene monomer, has a number average molecular weight of between 40,000 and 300,000, and has a cis-bond content of at least 92% and at least a portion of the polymerization catalyst system is preformed.

2. The process according to claim 1, wherein the preforming is conducted at a temperature of from about −20° C. to about 80° C.

3. The process according to claim 1, wherein the preforming includes aging for a period of time ranging from a few minutes to a few days prior to adding to the monomers.

4. The process according to claim 1, wherein the preforming is conducted in the presence of at least one conjugated diene monomer.

5. The process according to claim 4, wherein the preforming is conducted at a temperature of from about −20° C. to about 80° C.

6. The process according to claim 4, wherein the preforming includes aging for a period of time ranging from a few minutes to a few days prior to adding to the monomers.

7. The process according to claim 4, wherein the amount of at least one conjugated diene monomer present for the preforming is about 1 to about 500 moles per mole of the lanthanide or transition metal compound.

8. The process according to claim 4, wherein the amount of at least one conjugated diene monomer present for the preforming is about 5 to about 250 moles per mole of the lanthanide or transition metal compound.

9. The process according to claim 7, wherein the preforming is conducted at a temperature of from about −20° C. to about 80° C.

10. The process according to claim 7, wherein the preforming includes aging for a period of time ranging from a few minutes to a few days prior to adding to the monomers.

11. The process according to claim 1, wherein the preforming comprises two-steps with the first step comprising combining the alkylating agent with the lanthanide or transition metal compound to produce a first mixture, and the second step comprising combining the first mixture and the inorganic halide alcoholate to produce a second mixture, followed by adding the second mixture to the monomers.

12. The process according to claim 1, wherein (a) comprises a transition metal compound selected from the group consisting of nickel benzoate, nickel acetate, nickel naphthenate, nickel octanoate, nickel neodecanoate, bis(α-furyl dioxime) nickel, nickel palmitate, nickel stearate, nickel acetylacetonate, nickel salicaldehyde, bis(cyclopentadiene) nickel, bis(salicylaldehyde) ethylene diimine nickel, cyclopentadienyl-nickel nitrosyl, bis($\eta^3$-allyl)nickel, bis(π-cyclocta-1,5-diene)nickel, bis($\eta^3$-allyl nickel trifluoroacetate), nickel tetracarbonyl, nickel boroacylate, nickel neodecanoate borate, nickel hexanoate borate, nickel naphthenate borate, nickel stearate borate, nickel octoate borate, nickel 2-ethylhexanoate borate, and mixtures thereof.

13. The process according to claim 1, wherein the copolymer has a polydispersity index between 2 and 5.

14. A process for preparing a copolymer of an acyclic conjugated diene and a cyclic conjugated diene using a polymerization catalyst system, comprising:
    polymerizing at least one acyclic conjugated diene monomer with at least one cyclic conjugated diene monomer utilizing a polymerization catalyst system comprising
    (a) a transition metal compound selected from the group consisting of nickel, cobalt, and palladium compounds or a lanthanide metal compound selected from the group consisting of lanthanum, samarium and neodymium compounds,
    (b) an organoaluminum or organomagnesium alkylating agent; and
    (c) an inorganic halide alcoholate wherein the alcoholate portion of the inorganic halide alcoholate contains between 4 and 20 carbon atoms,
    wherein the resulting copolymer contains at least 90% acyclic conjugated diene monomer, has a number average molecular weight of between 40,000 and 300, 000, and has a cis-bond content of at least 92% to about 97% and at least a portion of the polymerization catalyst system is preformed at a temperature of from about −20° C. to about 80° C.

15. The process according to claim 14, wherein the preforming includes aging for a period of time ranging from a few minutes to a few days prior to adding to the monomers.

16. The process according to claim 14, wherein the preforming is conducted in the presence of at least one conjugated diene monomer.

17. The process according to claim 16, wherein the preforming includes aging for a period of time ranging from a few minutes to a few days prior to adding to the monomers.

18. The process according to claim 16, wherein the amount of at least one conjugated diene monomer present for the preforming is about 5 to about 250 moles per mole of the lanthanide or transition metal compound.

19. The process according to claim 14, wherein the preforming comprises two-steps with the first step comprising combining the alkylating agent with the lanthanide or transition metal compound to produce a first mixture, and the second step comprising combining the first mixture and the inorganic halide alcoholate to produce a second mixture, followed by adding the second mixture to the monomers.

20. A process for preparing a copolymer of an acyclic conjugated diene and a cyclic conjugated diene using a polymerization catalyst system, comprising:
polymerizing at least one acyclic conjugated diene monomer selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene with at least one cyclic conjugated diene monomer selected from the group consisting of 1,3-cyclopentadiene, 1,3-cyclohexadiene, 1,3-cycloheptadiene, and 1,3-cyclooctadiene utilizing a polymerization catalyst system comprising
(a) a transition metal compound selected from the group consisting of nickel, cobalt, and palladium compounds or a lanthanide metal compound selected from the group consisting of lanthanum, samarium and neodymium compounds,
(b) an organo aluminum alkylating agent having the formula $AlR_nX_{3-n}$, where each R, which may be the same or different, is a monovalent organic group that is attached to the aluminum atom via a carbon atom, where each X, which may be the same or different, is a hydrogen atom, a carboxylate group, an alkoxide group, or an aryloxide group, and where n is an integer of 1 to 3; and
(c) an inorganic halide alcoholate wherein the alcoholate portion of the inorganic halide alcoholate contains between 4 and 20 carbon atoms,
wherein the resulting copolymer contains at least 90% acyclic conjugated diene monomer, has a number average molecular weight of between 40,000 and 300,000, and has a cis-bond content of at least 92% to about 97% and
at least a portion of the polymerization catalyst system is preformed at a temperature of from about −20° C. to about 80° C.

* * * * *